Sept. 14, 1926.  
V. A. FYNN  
1,599,760  
SYNCHRONOUS MOTOR  
Filed April 4, 1924
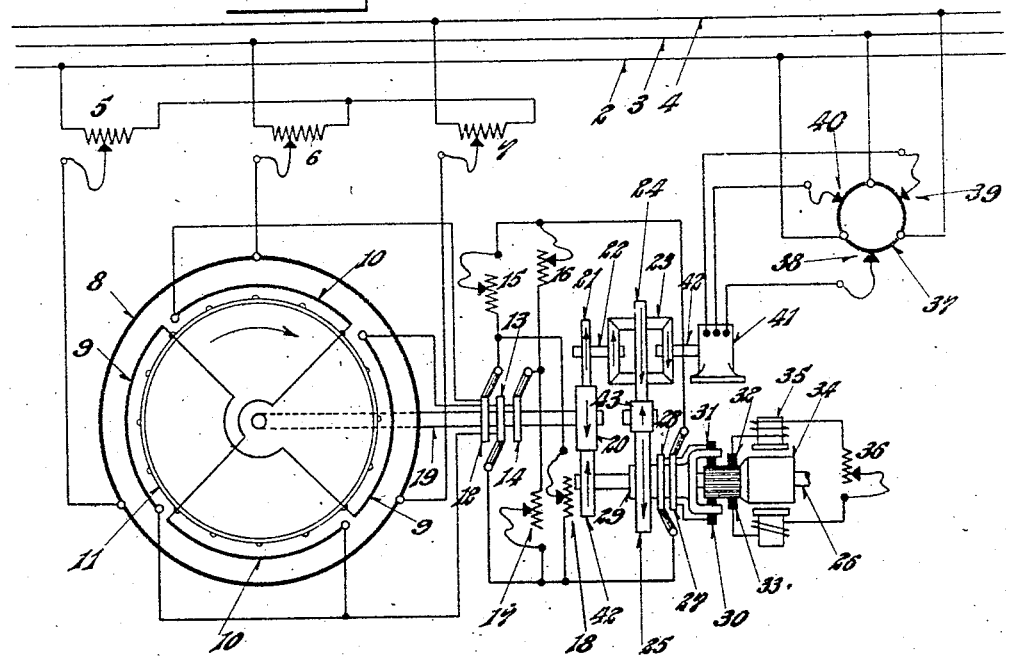
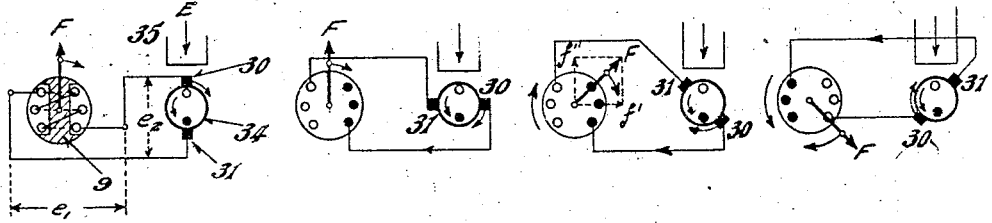
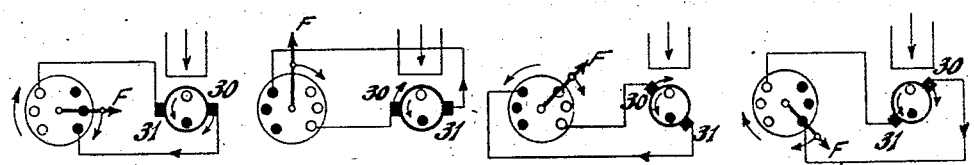
Inventor:
VALÈRE ALFRED FYNN.
John H. Bruninga
Attorney.

Patented Sept. 14, 1926.                                    1,599,760

UNITED STATES PATENT OFFICE.

VALÈRE ALFRED FYNN, OF ST. LOUIS, MISSOURI.

SYNCHRONOUS MOTOR.

Application filed April 4, 1924. Serial No. 704,092.

My invention relates to the starting and operation of dynamo-electric machines in which a revolving field of more or less uniform magnitude is produced at least during the starting period and which derive their excitation from an exciter not integral with the machine although it may be driven thereby. It also relates to the operation of single-phase machines excited in the manner stated and more particularly it relates to means for utilizing an ordinary direct current exciter for the purpose of improving the starting performance or the operation or both the starting and the operation of the synchronous machine with which said exciter co-operates.

The objects and features of this invention will appear from the detail description taken in connection with the accompanying drawings and will be pointed out in the claims.

In the accompanying diagrammatic drawings, Fig. 1 shows the invention as applied to a two-pole three-phase synchronous induction motor and a two-pole direct current exciter, Figs. 2 to 9, inclusive, are explanatory diagrams.

Referring to Fig. 1, the polyphase synchronous induction motor carries a three-phase winding 8 on its stator, which winding is connected to the supply 2, 3, 4 through the variable ratio transformers 5, 6, 7. The secondary member of the motor, mounted on the shaft 19, carries a squirrel cage 11 and a two-phase winding 9, 10 connected to the sliprings 12, 13, 14 also carried by the shaft 19. The two-pole direct current exciter has an armature 34 mounted on the shaft 26 and a stationary field structure 35 provided with the usual exciting winding connected to the stationary brushes 32, 33 co-operating with the commutator attached to the winding on the armature 34. An adjustable resistance 36 enables the field current of the exciter to be regulated. This exciter is driven by the synchronous polyphase motor through the gear wheels 20, 42 of equal pitch diameter. Also co-operating with the commutator of the exciter is a pair of movable brushes 30, 31 insulatingly held in a brush support or rocker mounted on a sleeve 29 which is free to revolve on the shaft 26 of the exciter. This sleeve insulatingly carries the sliprings 27, 28 to which the brushes 30, 31 are connected and has keyed to it a gear wheel 25 engaging with the gear wheel 24 through the intermediate gear wheel 43. The gear wheel 24 is of same pitch diameter as 25 and is carried by the middle element of a differential gear. One side element of this differential is mounted on the shaft 22 and driven by the motor shaft 19 through the gear wheels 20, 21 at the same speed as 19. The other side element of the differential is mounted on the shaft 42 and driven by the auxiliary synchronous two-pole motor 41 connected to the supply 2, 3, 4 through the two-pole phase regulator 37 provided with three movable contacts 38, 39, 40. When these contacts, which are normally spaced by 120 degrees, rest on the winding 37 of the phase regulator, the motor 41 is connected to the supply. The position of these contacts relatively to the points at which 37 is connected to the supply determines the phase of the voltages impressed on 41 with relation to the phase of the supply voltages. The brush 31 co-operating with the commutator of the exciter is connected to the secondary motor windings 9 and 10 through the sliprings 28 and 13 and the brushes co-operating with these sliprings. The brush 30 is connected to the secondary motor winding 9 through the sliprings 27 and 14 and the adjustable resistance 16. This brush is also connected to the secondary motor winding 10 through the sliprings 27 and 12 and the adjustable resistance 15. The sliprings 13, 14, which means the secondary motor winding 9, can be shunted and shortcircuited by the adjustable resistance 17. The sliprings 12, 13, which means the secondary motor winding 10, can be shunted and shortcircuited by the adjustable resistance 18.

When the rotor of the synchronous motor revolves clockwise, as seen from that end of the shaft 19 which does not carry the gear wheel 20, then the exciter armature 34 and the shaft 22 of the differential revolve counterclockwise. Under these conditions the auxiliary motor 41 should drive the shaft 42 of the differential in a clockwise direction. When the intermediate gear wheel 43 is used between the gear wheels 24 and 25, then the brushes 30, 31 will revolve clockwise, or against the rotation of the commutator of the exciter, when the speed of the auxiliary motor is greater than that of the main motor and vice versa. When the speeds of these two motors are the same then the brushes 30, 31 are stationary in space.

The motor shown in Fig. 1 may be started and brought close to the synchronous speed just like an ordinary squirrel cage or slip-ring polyphase induction motor. If a squirrel cage is provided and its resistance is low, the resistances 17, 18 are disconnected and the motor started with a terminal voltage below the normal, the reduction being secured by means of the variable ratio transformers 5, 6, 7. It is then preferred to give the resistances 15, 16 a high value at starting or to entirely interrupt the circuit of the brushes 30, 31 at that time.

If the resistance of the squirrel cage is high enough or if it is entirely omitted, then the full terminal voltage may be impressed on the motor even when at rest and the machine brought to near synchronism by shunting and finally shortcircuiting the secondary windings 9 and 10 by means of the resistances 17, 18. Whenever the synchronous motor is of an appreciable size it is preferred to reduce the current through the brushes 30, 31 to a negligible value during the starting operation with a view to sparing the commutator of the exciter. When the motor is a small one the induction motor torque producing currents induced in the windings 9 and 10 at starting can be allowed to close over the brushes 30, 31 and the commutator of the exciter, in which case the resistances 17, 18 may be dispensed with. Their use is, however, preferred in most cases.

The auxiliary motor 41 may be started before the main motor is started or it can be started later or concurrently with the main motor. If started first it will drive the brushes 30, 31 at synchronous speed as long as shaft 19 is at rest. As the main motor speeds up the speed of the brushes 30, 31 will diminish and become zero when the main motor has reached synchronism. As long as the auxiliary motor runs synchronously the brushes 30, 31 will revolve at the slip frequency of the main motor. As soon as the exciter 34, 35 "picks up", in other words, as soon as a voltage appears at the exciting brushes 32, 33 of the exciter, a voltage will also appear at the brushes 30, 31 and this voltage will be of slip frequency in so far as the main motor is concerned. The magnitude of this slip frequency voltage is independent of the speed of the brushes 30, 31 and only depends on the speed of the exciter armature 34 and on the available exciting flux. The frequency of this slip frequency voltage depends on the speed of the brushes 30, 31 and is independent of the speed of the exciter armature; it becomes zero, corresponding to a unidirectional voltage when the brushes 30, 31 become stationary while 34 revolves. Near synchronism this voltage alternates slowly and I make use of it at this stage to synchronize the main motor. At synchronism I make use of it to provide the unidirectional magnetization for the main motor and to compound the latter or in other words, to control its power factor characteristic with varying load.

After the main motor has reached as high a speed as its induction motor torque can produce, or at any desired earlier stage, I reduce the value of the resistances 15, 16, or of one of them, in one or more steps and correspondingly increase the value of the resistances 17, 18 if they are in use. By so doing I impress on the secondary windings 9, 10, or on one of them, an alternating voltage of slip frequency. If the phase of this voltage is properly chosen then I can secure a strictly unidirectional pulsating synchronizing torque which will bring the main motor into step with more than full load torque, or I can secure a substantially unidirectional synchonizing torque by a somewhat different phase setting. When but one of the windings 9 or 10 is connected to the brushes 30, 31 for synchronizing then the phase of the slip frequency voltage available at said brushes must be chosen with reference to the phase of the voltage generated in whichever secondary winding is being used. If both secondary windings 9 and 10 are used for synchronizing, then the phase of the slip frequency voltage is chosen with reference to the phase of the resultant of the voltages generated in each of the secondary windings.

After the machine is in synchronism, I can control its compounding characteristic by adjusting the position of the brushes 30, 31 on the commutator of the exciter for instance, with reference to the stationary brushes 32, 33 co-operating with the same exciter. To change the phase of the slip frequency voltage appearing at the brushes 30, 31 at sub-synchronous speeds, or to change the position of said brushes on the commutator of the exciter when the main motor runs at synchronous speed, I can change the phase of the voltages impressed on the auxiliary motor 41 by displacing the movable contacts 38, 39, 40 of the phase regulator 37. A crude way of achieving the same result is to momentarily interrupt the connections between the auxiliary motor and the supply. Another way is to displace the field structure 35 of the exciter.

The compounding characteristic can be very readily adjusted in case both secondary windings 9 and 10 are used by changing the ratio of the unidirectional ampereturns in said windings, for instance by means of the resistances 15, 16.

Just how the brushes 30, 31 should be set in order to obtain a certain compounding characteristic or just how the phase of the synchronizing voltage should be chosen in order to secure the desired synchronizing torque can be readily explained with the help of Figs. 2 to 9, inclusive.

In Fig. 2 the two-pole secondary of the main motor is shown as carrying but a single winding 9 placed in holes located near the periphery of the rotor-like secondary. The position of the corresponding defined polar projection secondary is indicated in dotted lines and this form of secondary is further distinguished by shading lines. The winding 9 is shown connected to the movable brushes 30, 31 co-operating with the armature 34 of the exciter. The slip-rings of Fig. 1 have been omitted. It is assumed that the flux F set up by the polyphase currents in the primary of the main motor revolves clockwise at slip frequency, while the rotor of said motor is stationary. This is the same as if F revolved synchronously and the rotor rotated in the same direction at synchronous minus the slip speed. The conditions to be considered are those obtaining very near synchronism, say at no-load. The exciter armature is supposed to revolve counterclockwise, as in Fig. 1, and the exciting flux E is directed as shown by the arrow within the field pole 35 of the exciter. The voltage generated in 9 by rotation of F is $e_1$, it is of slip frequency. The voltage $e_2$ appearing at the brushes 30, 31 which are supposed to revolve clockwise at slip frequency, as in Fig. 1, is of same frequency as $e_1$. In order to secure a strictly unidirectional synchronizing torque $e_2$ must be of same phase and direction as $e_1$. In other words, $e_2$ must be zero when $e_1$ is zero and at its positive maximum when $e_1$ is at its positive maximum. When the axis of F coincides with that of 9, as in Fig. 2, then $e_1$ is zero. So that $e_2$ may be zero at the same time, the axis of the brushes 30, 31 must concurrently coincide with the axis of the exciter exciting flux. Whether the brush 30 is to be connected to the lower or the upper terminal of 9 is settled by Fig. 3. After a movement through 90 electrical degrees, F and the brushes 30, 31 will occupy the positions shown in Fig. 3. Under these conditions the voltage generated in 9 by F would have the distribution shown in Fig. 3 by full and empty circles, the full circles or dots indicating downwardly and the empty circles indicating upwardly directed voltage or current. If 9 were shortcircuited it would produce a clockwise or positive torque with F. The brushes 30, 31 must be connected to send a current into 9 which will yield a positive torque with F. The direction of the voltage and current produced in 34 by its counterclockwise rotation within E is indicated by full and empty circles within the circle representing the winding 34 of the exciter and it is seen that brush 30 must be connected to the lower terminal of 9 in order to produce a positive unidirectional synchronizing torque. In the Figs. 2 to 9 inclusive the brushes 30, 31 are supposed to rest directly on the commuted winding 34; in practice a commutator would, of course, be used. The winding 9 is shown in Fig. 2 but not in the following ones, but the circles in the following figures indicate the current distribution produced by this winding in each case.

If the phase of the synchronizing voltage $e_2$ is allowed to differ by 90 degrees from the phase of the voltage $e_1$ generated in 9 at speeds very near the synchronous, then the current introduced into 9 by conduction and derived from the exciter, will produce a torque of double the slip frequency with equal positive and negative maxima. For otherwise equal conditions the maximum double frequency torque will be only half the magnitude of the maximum strictly unidirectional torque and only its positive impulses will be available for synchronizing the main motor. The question might arise should $e_2$ lead $e_1$ or lag behind it by 90 degrees in order to secure the most desirable results when $e_2$ is in phase quadrature with $e_1$.

In Fig. 4 the brushes 30, 31 have been displaced by 90 electrical degrees in the direction of rotation of the brushes and as compared with the condition illustrated in Fig. 2. This is equivalent to advancing the phase of $e_2$ 90 degrees with respect to that of $e_1$. For the brush position shown in Fig. 4, the synchronizing voltage and current are a maximum but the axis of F coincides with that of 9 and the torque is therefore zero. It is, however, important to note that this is the point at which the positive torque wave begins and that the direction in which the secondary is magnetized by the brush voltage now coincides with that of F. In Fig. 5 both F and the brushes 30, 31 have traveled through 45 degrees in a clockwise direction, the double frequency torque is positive and would be a maximum if the exciting flux E and the flux F had sinusoidal distribution. At no time during the positive torque wave does any part of the secondary magnetization oppose F. It is clear that if this torque could accelerate the rotor, or secondary, into synchronism the rotor would go into step with 9, producing a flux of same direction as F after making up an angular displacement of zero to 90 degrees at no-load; synchronization could readily take place. A movement through another 45 degrees makes the synchronizing voltage and therefore the synchronizing torque zero. A further movement of 45 degrees carries one into the region of the negative wave of the double frequency torque as shown in Fig. 6.

In Fig. 7 the brushes 30, 31 have been displaced by 90 electrical degrees against the direction of rotation of the brushes and as compared with Fig. 2. This is equivalent to retarding the phase of $e_2$ by 90 degrees with respect to that of $e_1$. Fig. 8 shows the halfway point of the negative wave of the resulting double frequency torque. The positive torque wave begins 45 degrees later, when F is at right angles to the axis of the secondary winding 9 and the brush voltage is zero. As the positive torque wave grows the brush current so magnetizes the secondary that at least part of this magnetization opposes F. The half way point of the positive wave is shown in Fig. 9 and discloses the fact that in order to synchronize with the right direction of excitation the rotor of the main motor would at no-load have to make up an angular displacement of 90 to 180 degrees instead of only zero to 90 as in Fig. 5. If synchronization does occur under the conditions of Fig. 9 it cannot be as smooth as under the conditions of Fig. 5. When $e_2$ does not coincide in phase with $e_1$ it should lead rather than lag behind $e_1$.

Turning now to the operating condition and the adjustment of the compounding characteristic, if the machine is synchronized with a strictly unidirectional torque or with $e_2$ strictly of same phase and direction as $e_1$, then at maximum load the brushes 30, 31 will possibly occupy the position shown in Fig. 3, in which case the brush voltage will be a maximum. If all or part of the load is thrown off, the rotor of the main motor will momentarily accelerate, running above synchronism, and will cause the differential gear to move the brushes counterclockwise or in the direction of rotation of the armature 34 of the exciter. This results in a demagnetizing effect of the armature reaction on the excitation of the exciter and therefore in a diminution of the excitation of the main motor, which is as it should be if the power factor is to be kept within acceptable limits as the load decreases. But this variation of the excitation may not suit the conditions under which the motor is to operate; if so, then the change in excitation brought about by the movement of the brushes 30, 31 in synchronous operation and due to the momentary acceleration or deceleration of the secondary of the motor in response to varying load can be modified by causing the brushes 30, 31 to occupy a position other than neutral, or that shown in Fig. 3, when the load on the synchronously running motor is a maximum. If the brushes are displaced against the rotation of the exciter armature then the armature reaction will assist the shunt excitation of the exciter at maximum load and a greater movement of the brushes 30, 31 is possible without bringing the coils undergoing commutation under the poles. If the brushes are displaced in the opposite direction, then the armature reaction will be demagnetizing even at maximum load. The compounding characteristic of the main motor can be further modified by compounding or decompounding the exciter in combination with the shifting of the brushes 30, 31 with varying load.

The phase of the synchronizing voltage or the position of the brushes 30, 31 in normal synchronous operation can most conveniently be adjusted by adjusting the phase of the voltages impressed on the auxiliary motor 41. The phase of the synchronizing voltage can readily be so chosen that a satisfactory synchronizing torque will be had, together with an acceptable compounding characteristic, without having to readjust the brushes 30, 31 after synchronism has been established. To this end $e_2$ may, for instance, be chosen to lead $e_1$ by, say, 45 degrees. The synchronizing torque will under these conditions have considerably greater positive than negative maxima and its positive maximum will not greatly differ from the maximum available. Such a torque may be said to be substantially unidirectional, the negative maxima not amounting to more than 18 per cent of the positive maxima.

If the gear wheel 43 is omitted and 24 gears directly into 25 then, at sub-synchronous speeds, the brushes 30, 31 will revolve in the same direction as the armature 34 of the exciter. This in no way interferes with or modifies the adjustments to be made in order to secure the desired conformation or magnitude of the synchronizing torque, but in synchronous operation a decrease in load will move the brushes 30, 31 against the direction of rotation of the armature 34, thus causing the armature reaction to assist the excitation of the exciter and producing a different operating characteristic. Whichever way the brushes 30, 31 are moved out of the neutral in synchronous operation, it will be understood that when the angular displacement is large enough the brush voltage will diminish whether the armature reaction assists or opposes the shunt excitation of the machine.

Instead of driving the shaft 26 of the exciter from the main motor, it can be driven by a synchronous or any other motor, in which case the voltage at the revolving brushes 30, 31 may have any desired amplitude even when the main motor is at rest. Otherwise the operation of the combination remains the same as when the exciter is driven by the main motor. In order to apply such a motor to the arrangement shown in Fig. 1, the gear wheel 42 is removed and the motor coupled to the exciter.

The number of poles of the auxiliary motor 41 is immaterial just so the gears driving the brushes 30, 31 are so proportioned that they revolve synchronously with respect to the exciter when the main motor is at rest and are at rest when the main motor operates synchronously. Generally speaking, the brushes should run at the slip speed of the generator multiplied by the ratio of the number of generator to the number of exciter pole pairs. When the generator is at rest its slip speed is equal to its synchronous speed.

In order to make full use of the properties of the improved motor I prefer to design both members without defined polar projections, using a short air-gap and well distributed windings as is usual in good induction motor practice. In that way a good starting, synchronizing and weight efficiency are secured.

While the discussion of the various conditions governing brush displacements and other adjustments are referred to a machine with revolving secondary, and such is illustrated, it will be understood that the secondary may just as well be stationary, in which case the primary will revolve.

While a theory has been advanced in connection with the machine referred to herein, this has been done with a view to facilitating its description and understanding and it is to be understood that I do not bind myself to this or any other theories.

It will be clear that various changes may be made in the details of this disclosure without departing from the spirit of this invention, and it is, therefore, to be understood that this invention is not to be limited to the specific details here shown and described.

Having thus described the invention, what is claimed is:—

1. A synchronous motor having a primary member provided with a winding, a secondary member having a winding in inductive relation to said primary winding, an exciter having a field produced by a unidirectional current and having an armature whose voltage is determined by said field, means cooperating with said armature to derive therefrom an auxiliary voltage which is of slip frequency near synchronism and unidirectional at synchronism, and means for impressing said auxiliary voltage on said secondary winding.

2. A synchronous motor having a primary member provided with a winding, a secondary member having a winding in inductive relation to said primary winding, an exciter having a field produced by a unidirectional current and having an armature whose voltage is determined by said field, means cooperating with said armature for impressing on said secondary winding a voltage which is of slip frequency near synchronism and unidirectional at synchronism, and means for controlling the phase of said voltage adapted to produce near synchronism a substantially unidirectional synchronizing torque.

3. A synchronous motor having a primary member provided with a winding, a secondary member having a winding in inductive relation to said primary winding, an exciter having a field produced by a unidirectional current and having an armature whose voltage is determined by said field, means cooperating with said armature for impressing on said secondary winding a voltage which is of slip frequency near synchronism and unidirectional at synchronism, means for controlling the phase of said voltage adapted to produce near synchronism a substantially unidirectional synchronizing torque, and adapted to produce at synchronism the desired unidirectional compounding characteristic.

4. A synchronous motor having a primary member provided with a winding, a secondary member having a winding in inductive relation to said primary winding, an exciter having a field produced by a unidirectional current and having an armature provided with a commutator and whose voltage is determined by said field, and brushes bearing on said commutator and connected with said secondary winding and adapted to deliver a voltage which is of slip frequency near synchronism and unidirectional at synchronism.

5. A synchronous motor having a primary member provided with a winding, a secondary member having a winding in inductive relation to said primary winding, an exciter having a field produced by a unidirectional current and having an armature provided with a commutator and whose voltage is determined by said field, brushes bearing on said commutator and connected with said secondary winding and adapted to deliver a voltage which is of slip frequency near synchronism and unidirectional at synchronism, and means cooperating with said brushes adapted to produce near synchronism a substantially unidirectional synchronizing torque.

6. A synchronous motor having a primary member provided with a winding, a secondary member having a winding in inductive relation to said primary winding, an exciter having a field produced by a unidirectional current and having an armature provided with a commutator and whose voltage is determined by said field, brushes bearing on said commutator and connected with said secondary winding and adapted to deliver a voltage which is of slip frequency near synchronism and unidirectional at synchronism, and means cooperating with said brushes adapted to control the phase of said voltage.

7. A synchronous motor having a primary member provided with a winding, a secondary member having a winding in inductive relation to said primary winding, an exciter having a field produced by a unidirectional current and having an armature provided with a commutator and whose voltage is determined by said field, brushes bearing on said commutator and connected with said secondary winding, and means for moving said brushes relatively to said commutator when the motor runs at a speed other than the synchronous.

8. A synchronous motor having a primary member provided with a winding, a secondary member having a winding in inductive relation to said primary winding, an exciter having a field produced by a unidirectional current and having an armature provided with a commutator and whose voltage is determined by said field, brushes bearing on said commutator and connected with said secondary winding, and means for moving said brushes relatively to said commutator in accordance with the departure of the motor from synchronism.

9. A synchronous motor having a primary member provided with a winding, a secondary member having a winding in inductive relation to said primary winding, an exciter having a field produced by a unidirectional current and having an armature provided with a commutator and whose voltage is determined by said field, brushes bearing on said commutator and connected with said secondary winding, means for moving said brushes relatively to said commutator when the motor runs at a speed other than the synchronous, and means for adjusting said brushes.

10. A synchronous motor having a primary member provided with a winding, a secondary member having a winding in inductive relation to said primary winding, an exciter having a field produced by a unidirectional current and having an armature provided with a commutator and whose voltage is determined by said field, brushes bearing on said commutator and connected with said secondary winding, and means responsive to motor load variations for displacing said brushes relatively to the axis of the exciter field produced by said unidirectional current.

11. A synchronous motor having a primary member provided with a winding, a secondary member having a winding in inductive relation to said primary winding, an exciter having a field produced by a unidirectional current and having an armature provided with a commutator and whose voltage is determined by said field, brushes bearing on said commutator and connected with said secondary winding, and means for moving said brushes relatively to said commutator in accordance with the slip frequency of the motor.

12. A synchronous dynamo electric machine with a winding on its secondary member, a direct current exciter, brushes on the exciter connected to the winding on the secondary member and means for driving said brushes at a speed equal to the slip frequency of the synchronous machine multiplied by the number of pole pairs of said machine and divided by the number of pole pairs of the exciter.

13. A synchronous dynamo electric machine, a direct current exciter and means dependent on changes in the peripheral speed of the synchronously operating machine to vary the voltage or current supplied by the exciter to said synchronous machine.

14. A synchronous dynamo electric machine, a direct current exciter and means dependent on changes in the peripheral speed of the synchronously operating machine to vary the exciting flux of the exciter.

In testimony whereof I affix my signature this 29th day of March, 1924.

VALÈRE ALFRED FYNN.